(12) United States Patent
Maienschein

(10) Patent No.: US 7,077,253 B2
(45) Date of Patent: Jul. 18, 2006

(54) TORQUE CONVERTER

(75) Inventor: Stephan Maienschein, Baden-Baden (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 1 day.

(21) Appl. No.: 10/704,264

(22) Filed: Nov. 6, 2003

(65) Prior Publication Data

US 2004/0112698 A1   Jun. 17, 2004

(30) Foreign Application Priority Data

Nov. 16, 2002  (DE) ................... 102 53 470

(51) Int. Cl.
*F16H 45/02* (2006.01)
*F16H 41/04* (2006.01)

(52) U.S. Cl. .................... 192/3.3; 192/70.17; 192/212; 60/338

(58) Field of Classification Search ............... 192/3.28, 192/3.29, 3.3, 70.17, 212; 464/68; 60/338
See application file for complete search history.

(56) References Cited

U.S. PATENT DOCUMENTS

| 5,667,448 A | 9/1997 | Friedmann |
| 5,674,155 A | 10/1997 | Otto et al. |
| 5,738,198 A | 4/1998 | Walth et al. |
| 5,782,327 A | 7/1998 | Otto et al. |
| 6,099,435 A * | 8/2000 | Halene et al. ................ 477/62 |
| 6,142,272 A * | 11/2000 | Meisner et al. ............ 192/3.29 |
| 6,244,401 B1 * | 6/2001 | Maienschein et al. ....... 192/3.3 |
| 2001/0007383 A1 * | 7/2001 | Schmid ...................... 267/286 |
| 2001/0015308 A1 * | 8/2001 | Heller et al. ............... 192/3.29 |
| 2002/0175037 A1 * | 11/2002 | Wack et al. ............... 192/3.29 |
| 2003/0089567 A1 * | 5/2003 | Bauer et al. ............... 192/3.29 |

FOREIGN PATENT DOCUMENTS

WO    WO 00/77418    * 12/2000

* cited by examiner

*Primary Examiner*—Richard M. Lorence
(74) *Attorney, Agent, or Firm*—Darby & Darby

(57) ABSTRACT

A hydrokinetic torque converter, particularly for use in the power train of a motor vehicle, has a housing which can receive torque from the prime mover of the vehicle and drives a pump adapted to rotate a turbine on the input shaft of the change-speed transmission. The turbine can also receive torque from the housing by way of a bypass clutch and a damper borne by a hub which is mounted on the input shaft. A feature of the invention resides in the simplicity of design and low cost of several component parts of the torque converter and in a novel mode of assembling the component parts.

22 Claims, 11 Drawing Sheets

TORQUE CONVERTER

BACKGROUND OF THE INVENTION

The invention relates to improvements in torque converters, and more particularly to improvements in torque converters which can be utilized with advantage in the power trains of motor vehicles, e.g., to transmit torque between a rotary output member (such as a crankshaft or a camshaft) of a prime mover (e.g., a combustion engine or a hybrid drive) and the rotary input member of the transmission which drives some or all wheels of the motor vehicle.

As used herein, the term "torque converter" is intended to denote a hydrodynamic or hydrokinetic torque converter comprising a rotary housing, a pump which rotates with the housing, a turbine which can rotate with and relative to the pump, and normally or frequently a stator or guide wheel between the pump and the turbine. Torque converters of such character are known and utilized for many decades and certain presently known torque converters are disclosed, for example, in commonly owned U.S. Pat. Nos. 5,738,198 (granted Apr. 14, 1998 to Walth et al. for "FRICTION ELEMENT FOR USE IN CLUTCHES") and 5,782,327 (granted Jul. 21, 1998 to Otto et al. for "HYDROKINETIC TORQUE CONVERTER AND LOCKUP CLUTCH THEREFOR").

The housing of the torque converter is filled with oil or another suitable hydraulic fluid which causes the turbine to turn in response to rotation of the pump. The stator serves to enhance the efficiency of the torque converter. The energy of the hydraulic fluid stream in the turbine entails the generation of torque which is transmitted to the output shaft of the turbine. Such output shaft can constitute the input shaft of the change-speed transmission in the power train of the motor vehicle.

Since the rotary output member of the prime mover (such as the crankshaft of a combustion engine) and the rotary mass which shares the movements of the output member tend to develop torsional vibrations, the torque converter in the power train of the motor vehicle is normally equipped or associated with a shock absorber or damper which is designed to store larger temporary or momentary torsional vibration amplitudes and to transmit them to the transmission when the amplitude of torsional vibrations being transmitted by the engine decreases. This minimizes the overall torsional vibration amplitudes.

A torsional vibration damper can further comprise damping elements which are set up to absorb additional undesirable torsional vibration energy. Still further, the torsional vibration damper can comprise a so-called bypass or lockup clutch which is engaged or closed when the ratio of turbine RPM to pump RPM in the housing of the torque converter is 85% or thereabout. This increases the efficiency of the torque converter to, or close to, 100%. Closing or engagement of the bypass clutch is effected by a flow of hydraulic fluid in the torque converter. Such fluid flow engages or closes the bypass clutch and can constitute the flow which issues between the pump wheel and the turbine wheel or an additional (hydrostatic) stream or flow.

The flow of energy in a turbine damper takes place by way of an inlet or input part to thereupon flow along springs which are provided to transmit energy to an output or outlet part (also called flange). The output part is connected to or is of one piece with a hub which, in turn, transmits energy to the turbine shaft, i.e., to the input shaft of the change speed transmission.

It will be seen that a conventional torque converter for use in the power train of a motor vehicle employs a substantial number of component parts which are installed in the power flow between the turbine and the input shaft of the transmission and which must be capable of transmitting and standing the supplied torque. The quality of such parts (and of the spare parts therefor) must be very high which contributes significantly to the initial and repair cost, especially if the torque converter is to be installed in the power trains of series-produced motor vehicles.

OBJECTS OF THE INVENTION

An important object of the present invention is to simplify the construction and to thus reduce the cost of a torque converter without reducing its quality and reliability.

Another object of this invention is to provide a torque converter which can be utilized as a superior substitute for conventional torque converters.

A further object of the invention is to improve that part or those parts of a torque converter which includes or include the turbine, the input part(s) adjacent the turbine and the hub.

An additional object of the instant invention is to simplify the making of component parts of a torque converter, especially to avoid or to minimize the making of such parts in material removing machines, by resorting to material deforming and analogous apparatus, tools and machines.

Still another object of this invention is to provide a novel turbine damper for use in a torque converter of the above outlined character.

A further object of the invention is to provide novel and improved expedients for connecting the elements of the turbine damper to each other and/or to other parts of the torque converter.

Another object of the invention is to provide novel and improved connections between the turbine and the turbine damper in a torque converter of the above outlined character.

An additional object of the invention is to simplify the assembly of parts in the above outlined torque converter.

Still another object of the present invention is to reduce the likelihood of escape of fluid from the housing of the torque converter.

SUMMARY OF THE INVENTION

The invention is embodied in a hydrokinetic torque converter which is utilized for the transmission of torque between a rotary output member (e.g., a crankshaft) of a prime mover (such as an internal combustion engine) and a rotary input member of a transmission. The improved torque converter comprises a turbine, a damper for the turbine, and means for transmitting hydrokinetic energy from the turbine to the input member. Such energy transmitting means includes a hub and an additional component.

The additional component can include or constitute a part which is produced essentially without machining, i.e., without removal of material of the blank which is converted into the additional component.

The transmission is or can constitute a continuously variable transmission, e.g., a transmission of the type disclosed in commonly owned U.S. Pat. No. 5,667,448 granted Sep. 16, 1997 to Friedmann for "POWER TRAIN".

It is also possible to employ an automatic transmission.

It is also possible to employ an additional component which is a stamped metallic blank constituting a shell of the turbine of an input element of the damper. The shell can be provided with a collar which is rotatably mounted at the periphery of the hub; this hub is or can be mounted on the input member of the transmission (such input member can constitute the output shaft of the turbine).

The damper can include two coaxial input elements and an output element between them. One of the input elements can be provided with a collar which is rotatably mounted at the periphery of the hub. As already mentioned hereinbefore, the hub can be provided on the input member.

The shell of the turbine can be provided with a first collar and one input element of the damper can be provided with a second collar. A cylindrical surface of the hub can be spaced apart from one of the collars and such torque converter can further comprise a thrust bearing or another suitable bearing which is interposed between and is guided by the hub and the one collar. The bearing can be at least partially surrounded by or it can at least partially surround the one collar.

One input element of the damper can be form-lock-ingly connected to the shell of the turbine. Such form locking connection can include one or more rivets, clinched bolts and/or warts. Alternatively, the connection between the turbine shell and an input element of the damper can constitute a soldered connection which is established by resorting to a suitable adhesive or a welded connection. The welded connection can be established by resorting to laser welding, resistance welding, spot welding or friction welding.

The output element of the damper can be connected to the hub on the input member of the transmission by suitable means for non-rotatably securing profiled portions of the output element and input member. The securing means can comprise a single cam. With the exception of such single cam, the securing means can have an at least substantially circular shape. The cam and/or another part of the securing means can constitute or include a sintered part or a drop forged part. One input element of the damper can be arranged to face away from the at least one output element and can be provided with a circumferentially extending internal profile; the hub of such torque converter can be provided with an external profile which is adjacent to and cooperates with the internal profile to permit a predetermined angular movement of the hub and the input element relative to each other. At least one of these profiles can be provided with at least one gear tooth, and at least one of the profiles can be arranged to be automatically centered by the other profile. At least one of the profiles can be provided with an axially homogeneous cross-sectional outline and can include portions of greater and lesser depth alternating with each other in the circumferential direction of the one profile. At least one of the profiles can have a cyclical shape. Furthermore, at least one of the profiles can be obtained with resort to a broaching or stamping operation. For example, the external profile can be obtained by resorting to a stamping operation.

The hub and the damper of the improved torque converter can be arranged to move relative to each other and can be coupled to one another. The just mentioned torque converter can further comprise a bypass clutch or lockup clutch which is interposed between the additional component and the damper and includes a package of laminations, a first lamination carrier which is borne by a housing for the turbine and a second lamination carrier which is borne by the damper. The outer diameter of the hub is greater than the inner diameter of the second lamination carrier and/or the inner diameter of one input element of the damper. This can constitute a safety device.

The additional component can consist, at least in part, of a sintered metal (such as steel). This component can constitute a shaped article; its external profile is or can be complementary to, the internal profile of an input element of the damper and can be located adjacent the shell of the turbine.

The additional component can be provided with at least one projection which is received in a recess of the output element of the damper. Such recess can have an arcuate shape and can receive the at least one projection with play so that the additional component and the output element of the damper can turn relative to each other to an extent determined by the play.

Not only the additional component but the hub, too, can be made of steel or another suitable metallic material. In addition to the two input elements and the output element between the two input elements, the damper can further comprise at least one distancing element which connects the two input elements to each other. The output element can be provided with a recess which receives the at least one distancing element with predetermined freedom of movement of the output element and the input elements relative to each other.

The torque converter can be further provided with securing means on the hub and on the damper, and such securing means coacts with at least one resilient element which reacts against the securing means. This resilient element can include one or more diaphragm springs and/or resilient undulate discs or washers.

The damper of the improved torque converter can comprise the aforementioned input element(s) and an annular resilient element, such as a diaphragm spring or an analogous or equivalent resilient element between the hub and the input element(s). Instead of one or more diaphragm springs, one can employ one or more undulate discs.

If the radially outermost portions of input elements forming part of the damper abut each other, they can be welded to one another.

If the radially outermost portions of the two input elements of the damper abut each other at an angle, such as at an at least substantially right angle, they can also be welded or analogously secured to each other.

As already mentioned hereinbefore, the transmission which receives torque from the rotary input member (such as the output shaft of the prime mover) can form part of the power train in a motor vehicle. The torque converter embodying the aforementioned pump, turbine and damper for the turbine preferably further includes the bypass clutch, such as a fluid-operated clutch acting between the housing of the torque converter and the turbine or the output shaft of the turbine.

The novel features which are considered as characteristic of the invention are set forth in particular in the appended claims. The improved torque converter itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 14b is a plan view of the structure which is illustrated in FIG. 14a.

DESCRIPTION OF PREFERRED EMBODIMENTS

Figure 1:
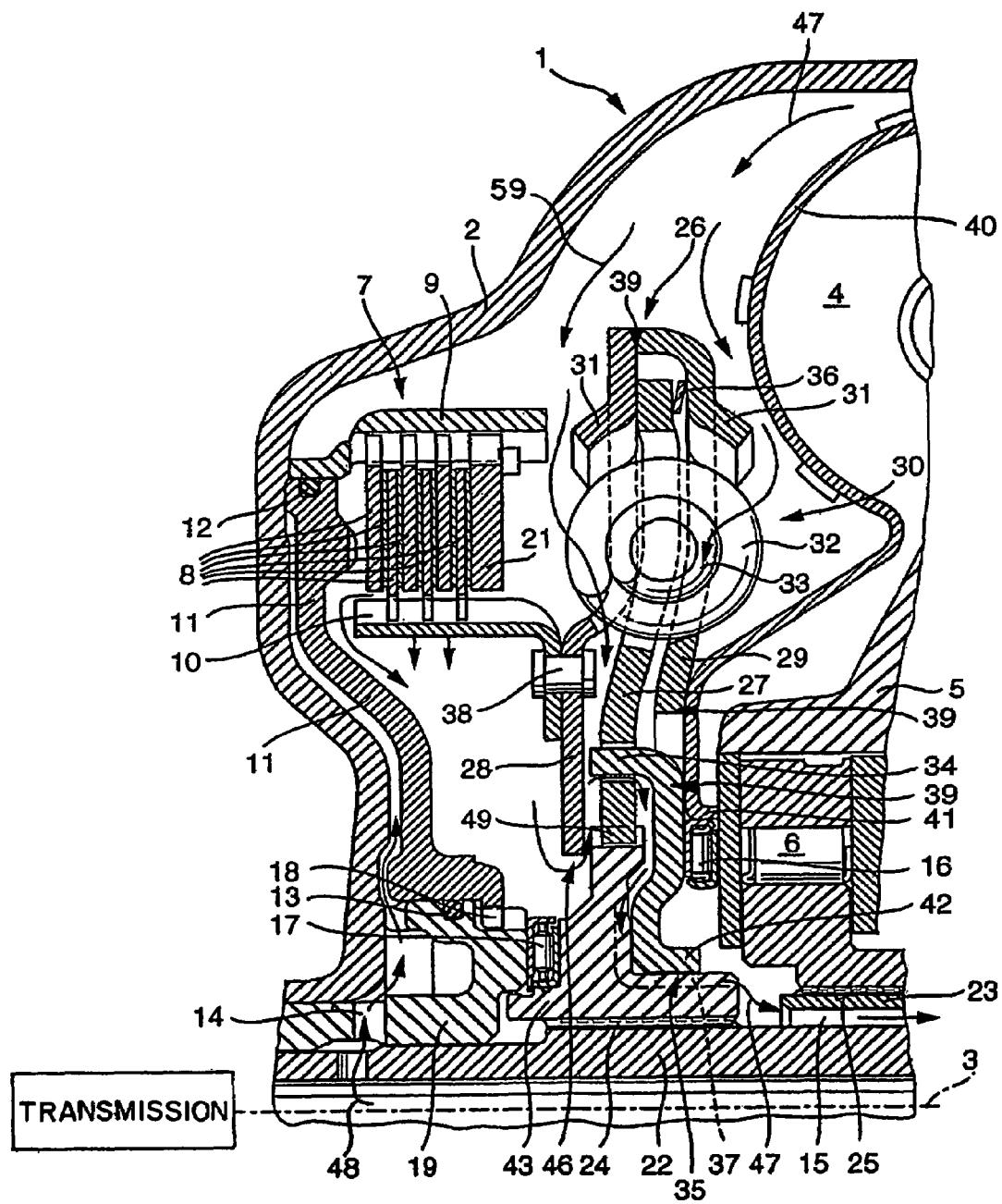
FIG. 1 is a fragmentary axial sectional view of a torque converter which embodies one form of the present invention and employs a collar-shaped shell for the turbine, a collar-shaped input element for the turbine damper, and at least one welded seam between the collar-shaped input element and a second input element of the turbine damper.

Referring first to FIG. 1, there is shown a portion of a torque converter 1 which embodies a first form of the present invention and is assumed to be installed in the power train of a motor vehicle to transmit torque between the rotary output member (not shown) of a prime mover and the rotary input member 22 of a change-speed transmission. Reference may be had to commonly owned U.S. Pat. No. 5,674,155 granted Oct. 7, 1997 to Otto et al. for "METHOD OF AND APPARATUS FOR TRANSMITTING TORQUE IN THE POWER TRAINS OF MOTOR VEHICLES". The disclosure of each and every patent and patent application identified in the specification of the present application is incorporated herein by reference. Furthermore, and referring again to the drawing, the expressions such as "above", "below", "right", "left" and analogous terms refer only to the orientations and positions of parts which are shown in FIGS. 1 to 14b but not necessarily or invariably to the power trains of motor vehicles in actual use. Still further, and as far as certain rotary parts of the improved power train are conerned, they are shown exclusively as they appear in the planes, of the respective Figures.

That portion of the torque converter 1 which is shown in FIG. 1 can form part of a relatively small as well as of a relatively or very large torque converter. This torque converter comprises a housing 2 which accommodates a number of parts including a pump having a casing of one piece with or connected to the housing 2 adjacent the right-hand side of a turbine 4. A stator or guide wheel 5 is provided in the housing 2 between the turbine 4 and the pump. A bypass clutch or lockup clutch 7 is installed in the housing 2 and can be engaged to transmit torque from the housing directly to the damper 26 for the turbine 4.

The aforementioned constituents of the torque converter 1 are rotatable about a common axis 3. The stator 5 has an internal gear 25 (which may but need not be a circumferentially complete toothed element) mating with a complementary external gear on the shaft 23 of the stator 5. The hub 43 is also provided with an internal gear 24 which mates with a complementary gear on a turbine shaft 22. The internal gear 24 and the complementary external gear of the shaft 22 need not be circumferentially complete toothed elements.

The character 47 denotes a stream or flow of oil or another suitable hydraulic fluid which issues partly from the gap between the non-illustrated pump and the turbine 4 and flows through the interior of the housing 2 of the torque converter 1. This fluid stream 47 leaves the torque converter 1 by way of a fluid evacuating channel 15 at the periphery of the turbine shaft 22. The channel which supplies the fluid forming the flow 47 between the non-illustrated pump and the turbine 4 of the torque converter 1 is not shown in the drawing. The fluid stream 47 rotates the turbine 4, and the thus generated torque is applied to the collar-shaped casing or shell 40 of the turbine. The character 39 denotes one of preferably several welded seams which are provided to non-rotatably connect the right-hand input member or element 29 of the turbine damper 26 to the casing or shell 40. Thus, the welded seam or seams 39 serves or serve to transmit torque between the shell 40 and the turbine damper 26.

In addition to the collar-shaped right-hand input member or element 29, the turbine damper 26 comprises a second (left-hand) input member or element 28, an output member or element 27 between the input elements 28, 29 as well as an axial biasing element 36 reacting against the input element 29 and bearing upon the output element 27 to thus urge the latter toward and against the input element 28. Still further, the damper 26 for the turbine 4 comprises a combination of coil springs including an outer arcuate spring 32 and an inner arcuate spring 33 which latter is confined in the outer spring 32. These springs are confined in an arcuate window 30 of the turbine damper 26. The window 30 is bounded by wings 31 forming part of the input elements 28, 29. In order to prevent excessive angular movements of the output element 27 and the input elements 28, 29 relative to each other, the damper 26 is provided with an abutment or projection or stop 34 which, in the damper 26 of FIG. 1, comprises a lug bent inwardly from the right-hand input element 29 and extending into a recess (such as an arcuate slot) in the adjacent portion of the output element 27. The projection 34 can be deformed out of the plane of the adjacent portion of the output element 27 during the making of the latter or in a subsequent operation. The length of the arcuate slot in the output element 27 and the dimensions of the projection 34 determine the extent of angular movability of the elements 27 and 28, 29 relative to each other.

The left-hand input element 28 of the damper 26 is secured to a radially inner lamination carrier 10 of the bypass clutch 7 by at least one rivet, bolt or an analogous connector or fastener 38. The bypass clutch 7 further comprises a radially outer lamination carrier 9 and an array of annular laminations 8 between the carriers 9, 10. Alternating laminations 8 are non-rotatably coupled to the carriers 9 and 10. Such couplings can include suitable cooperating profiles on the evenly numbered laminations 8 and the carrier 9, and suitable cooperating profiles on the oddly numbered laminations and the carrier 10.

A pressure plate 21 and/or an equivalent or complementary biasing device (e.g., a ring) is provided to urge the laminations 8 of the illustrated array between the carriers 9, 10 against each other. If the bypass clutch 7 is to be engaged, the laminations 8 are caused to move in a direction to the right (as viewed in FIG. 1) in order to bias the neighboring surfaces of the laminations against each other and to thus establish a frictional engagement between the laminations. The biasing of the laminations 8 against each other and toward the pressure plate 21 is effected by a fluid flow 48 which issues from an axial passage of the shaft 22 and flows through a channel 14 radially outwardly against the left-hand side of a suitably configured (such as annular) biasing member 11 which is inwardly adjacent the left-hand wall of the housing 2. The biasing member 11 is slidable axially of the torque converter 1 along the external surface of the adjacent portion of the shaft 22.

In order to prevent rotation of the shaft 22 and a guide 19 for the biasing member 11 relative to each other and/or of the member 11 relative to the surrounding cylindrical surface, the biasing member 11 has internal teeth 18 meshing with complementary external teeth of the guide 19. Annular sealing elements (e.g., washers) 12 and 13 are employed to prevent or to reduce leakage of fluid forming the flow 48 at the outer lamination carrier 9 and at the guide 19, i.e., to ensure that the pressure of fluid forming the flow or stream 48 can be maintained at a desired value or within a predictable range.

If the pressure of fluid in the flow 48 is increased, the biasing member 11 urges the laminations 8 toward the pressure plate 21, i.e., the bypass clutch 7 is engaged to a desired extent. On the other hand, a fluid stream 59 (supplied by the stream 47) can act upon the laminations 8 by way of minute and/or larger passages in the lamination carriers 9, 10 to thus disengage (open) the bypass clutch 7 to a desired extent. The result is that the biasing member 11 moves in a direction to the left. The stream 47 can flow out of the housing 2 by way of local channels 37, at least some of which are or can be provided in the hub 43 for the output element 27 of the turbine damper 26 and communicate with the evacuating channel 15.

FIG. 1 further shows several structural details which are important parts of the present invention. In accordance with a first feature of this invention, the casing or shell 40 of the turbine 4 is connected to the right-hand input element 29 of the turbine damper 26 by one or more welded seams 39. The illustrated connections 39 are laser welded seams; this exhibits the advantage that two substantially plate-like parts (here portions of the casing 40 and input element 29) can lie face-to-face or side-to-side relative to each other and the upper or outer part (40) can be securely affixed to the lower part (29) without customary preparation for the making of a welded seam.

Another desirable novel feature of the torque converter 1 which is shown in FIG. 1 resides in that the right-hand input element 29 of the turbine damper 26 is provided with a collar 42 and thus constitutes; or resembles a bearing sleeve overlying (surrounding) the aforementioned hub 43. Since the shell 40 is welded (at 39) to the input element 29, the collar 42 of this element can be said to constitute a nave-like or hub-shaped support 35 for the turbine 4 on the hub 43.

The shell 40 of the turbine 4 is also provided with a collar 41. This collar surrounds a needle bearing 16 which serves to reduce friction between the turbine 4 (and more particularly the shell 40) and the stator or guide wheel 5. Such friction could develop in response to rotation of the parts 4 and 5 relative to each other, i.e., when such relative rotation is not blocked by the freewheel 6 of the stator.

A third desirable feature of the torque converter 1 which is shown in FIG. 1 resides in the provision of a kinematic connection between the output element 27 of the turbine damper 26 and the hub 43 for the nave 35. These parts are connected to each other by a profiling 49 which has a homogeneous cross section (as seen in the direction of the axis 3). A presently preferred profiling 49 includes an internal gear in the output element 27 and a complementary external gear on the adjacent portion of the hub 43.

The profiling 49 serves to perform several tasks. The first task is to permit axial movements of the parts 26 and 43 in response to exertion of an axial thrust upon the turbine damper 26 and/or upon the hub 43. If such axial movement were opposed or prevented, this could lead to the development of stresses within the turbine damper 26 which, in turn, could affect the pre-selected frictional engagement (in the region of axial biasing element 36, e.g., a diaphragm spring or an undulate washer) between the input elements 28, 29 and the output element 27 of the turbine damper 26.

Another advantage of the profiling 49 between the parts 27 and 43 is that it simplifies the assembly of the torque converter 1. For example, if the shell 40 of the turbine 4 is welded (at 39) to the right-hand input element 29 of the turbine damper 26, and if the inner lamination carrier 10 is fixedly secured (e.g., riveted, as at 38) to the left-hand input element 28 of the damper, the two "halves" (27 and 28, 29) of the damper can be assembled and their radially outermost portions welded (as shown at 39 in FIG. 1) or otherwise securely affixed to each other as soon as the output element 27 and the axial biasing element 36 are properly positioned relative to each other and relative to the other neighboring parts. In lieu of welding (at 39), the input elements 28, 29 can be riveted to each other. The thus obtained assembly of parts constituting or forming part of the turbine damper 26 extends from the inner lamination carrier 10 to the turbine 4.

Once the assembly of the torque converter 1 in the above outlined manner is completed, it is of advantage if, subsequent to insertion of the hub 43 into the housing 2, the unit including essentially the inner lamination carrier 10, the turbine damper 26 and the turbine shell 40 is guided by and pushed over the profiling 49 at the hub 43. However, in the torque converter 1 of FIG. 1, the inner diameter of the left-hand input element 28 is much smaller than the outer diameter of the profiling 49 at the hub 43. Consequently, the thus dimensioned input element 28 of the damper 26 does not permit for a subsequent "threading" of the hub 43 into the output element 27 of the damper 26. On the other hand, when the preliminary assembly of the turbine damper 26 includes insertion of the hub 43 and the radially outermost portions of the input elements 28, 29 are secured to each other in a next following step, the hub 43 cannot become lost during the next-following stage(s) of assembly of the torque converter 1. Thus, one can say that the reduction of inner diameter of the input element 28 and/or an increase of the outer diameter of the hub 43 constitutes a safety undertaking or device 46 which reduces the likelihood of losing and/or misplacing certain component parts of the torque converter 1 during assembly.

FIG. 1 further shows an additional novel structural feature or arrangement which concerns the turbine damper 26. Thus, whereas the radially outermost portion of the left-hand input element 28 extends at least substantially radially outwardly (i.e., such radially outermost portion can be said to resemble or constitute a flat washer), the radially outermost portion of the right-hand input element 29 is cupped so that it includes or constitutes a cupped (tubular) portion extending in the direction of the axis 3, i.e., at least substantially at right angles to the flat disc-shaped radially outermost portion of the left-hand input element 28. An advantage of such configuration of radially outermost portions of the input elements 28, 29 is that the element 29 provides requisite space (i.e., an annular chamber) which accommodates the output element 27 as well as the axial biasing element 36 which urges the radially outermost portion of the output element 27 against the input element 28 and which reacts against the radially extending portion of the input element 29. The input elements 28, 29 can be welded to each other sequentially.

Another advantage of the welded joint 39 between the radially outermost portions of the input elements 28, 29 over another joint (such as the riveted joint 38 between the input element 28 and the inner lamination carrier 10) is that one can dispense with additional sheet metal material (as seen in the radial direction of the torque converter 1) in order to provide room for rivet heads. Otherwise stated, by welding (at 39) the radially outermost parts of the input elements 28, 29 to each other, one can obtain a smaller-diameter damper 26 without adversely affecting its function and/or other desirable technical data.

The shell 40 of the turbine 4 and at least one of the input elements 28, 29 of the turbine damper 26 can be made of sheet-like material, such as steel sheet, preferably in a stamping machine. The collar 41 of the shell 40 can be obtained by bending and/or otherwise deforming the radially innermost portion of the blank which is being converted into the shell 40. An advantage of the collar 41 is that it provides a relatively large internal cylindrical or substantially cylindrical surface rotatably surrounding or rotating with the adjacent part (such as the adjacent race of the needle bearing 16 shown in FIG. 1) or with a hub surrounding the shaft 22.

The collar 42 of the output element 27 of the turbine damper 26 (i.e., that part of the damper which is adjacent the shell 40) also exhibits a relatively large internal surface which surrounds the hub 43. The collars 41 and 42 contribute to stable mounting of the corresponding parts 40 and 29 in the housing 2 of the torque converter 1. Each of these collars can also serve one or more additional purposes, e.g., to limit or to prevent axial movements of the corresponding parts 40 and 29 in the housing 2. Thus, and as can be seen in FIG. 1, the collar 42 abuts the hub 43 for the input element 27, and the collar 41 abuts the stator 5.

If certain parts of the improved torque converter 1 are made of a metallic sheet material, e.g., of sheet steel, this results in the formation of ribs or burrs or analogous projections the orientation of which depends or can but need not depend upon the direction of the stamping operation, or in the development of axially extending scorings, flutes or the like. Such burrs and/or flutes can strongly affect the bearing and/or gliding abilities of the thus produced parts; for example, the collar 41 or 42 could damage the adjacent external surface of the bearing 16 or the support 35. Such problems can be overcome by subjecting selected surfaces of the collar 41 and/or 42 to a secondary treatment which enhances the quality (such as smoothness) of the thus treated surfaces. For example, the secondary treatment can involve a turning operation, e.g., a turning to a depth of one or more tenths of one millimeter. This greatly prolongs the useful lives of the thus treated parts and of the components which are in rolling contact or frictional contact with such parts.

The aforediscussed material removing treatments in a turning machine can be replaced by or resorted to in addition to other finishing or smoothing treatments, e.g., by resorting to a broaching tool (needle) or to a roller-burnishing tool, i.e., to a treatment which need not involve removal of material from selected surfaces of the parts 41 and/or 42 but merely necessitates a shifting of some material to thus enhance the smoothness of the selected treated surface.

The collar 42 surrounds the adjacent portion (35) of the hub 43. On the other hand, the collar 41 surrounds the needle bearing 16. The hub 43 is adjacent a needle bearing 17 between this hub and the guide 19. The collar 41 is directly adjacent the needle bearing 16 but the collar 42 is remote from the bearing 17. The arrangement can be such that at least one of the bearings can be surrounded by and at least one of the bearings can surround a collar. The diameter of a needle bearing can geatly exceed the geometry of a collar because a large-diameter needle bearing is capable of ensuring a more satisfactory guidance of the neighboring part or parts.

During assembly of the improved torque converter, it is presently preferred to prefabricate certain component parts and the thereupon connect such parts to each other in one or more subsequent steps. As a rule, or at least in many instances, the last step includes securing the housing or casing or shell of the (non-illustrated) pump to the housing 2 of the torque converter 1, i.e., such step is normally carried out subsequent to installation of the bypass clutch 7, turbine damper 26, turbine 4 and stator 5 in the housing 2. The housing of the pump is thereupon welded or otherwise affixed to the adjacent part or parts. The left-hand input element 28 of the turbine damper 26 is or can be riveted (at 38) to the inner lamination carrier 10 of the bypass clutch 7. This is of advantage because a premature welding or soldering of the right-hand input element 28 to the turbine shell 40 could result in problems during the final assembling steps. Thus, and since the improved torque converter comprises a substantial number of coaxial parts, the assembly of such parts can result in several minor misalignments. When totalized, such minor misalignments result in a pronounced misalignment of certain neighboring parts which, consequently, cannot be properly connected to and/or otherwise operatively associated with each other.

If the assembling work involves the utilization of riveting tools, eventual misalignments of certain parts relative to each other could prevent a proper or optimal positioning of such tools relative to each other and/or relative to the parts which must or should be riveted to one another. In order to avoid such problems, certain presently known proposals to assemble a torque converter involve the utilization of a non-rotatable insertable connection between an input element (29) of the turbine damper and the adjacent portion of the turbine shell (40). Thus, a conventional assembly of parts in a standard torque converter often employs only the inner lamination carrier and the turbine damper.

In contrast to the just described conventional torque converters, the shell 40 of the turbine 4 in the improved torque converter 1 is not only non-rotatably coupled with but is also fixedly secured to the output element 29 of the turbine damper 26. This exhibits the advantage that, once such parts are securely affixed to each other, their mutual positions remain unchanged during the useful life of the torque converter. It is to be borne in mind that the parts of the torque converter are subjected to very pronounced mechanical and, at least at times, to very pronounced thermal stresses; this could readily entail undesirable shifting, especially axial shifting, of certain component parts relative to each other. Since the output element 27 of the turbine damper 26 is connected with the input shaft 22 of the transmission by way of a hub (43 in FIG. 1), and since this hub is maintained in a predetermined axial position by means of one or more bearings (such as the needle bearing 16 and/or 17), the profiling 49 or an equivalent thereof ensures that the output element 27 has requisite freedom of axial movement relative to the hub 43. This brings about several important advantages and possibilities at least one of which will be elaborated upon in connection with the description of FIG. 2 et seq.

In accordance with a feature of the invention, the left-hand input element 28 of the turbine damper 26 is provided with a ring-shaped internal profile (not shown in FIG. 1 but shown in FIG. 7) which is or which can be designed in such a way that it allows for a predetermined angular displacement of the element 28 and a hub (such as 43) relative to each other. Once such predetermined (maximum) angular displacement is reached, further angular displacement of the input element 28 (i.e., of the input elements 28, 29) relative to the hub 43 is prevented in a simple, efficient and reliable manner.

A presently preferred shaping of the parts forming the profiling 49 includes an external gear on the hub 43 and a complementary internal gear of the output element 27 of the turbine damper 26. The same can hold true for a profiling (if provided) between the input element 28 of the turbine damper 26 and the hub 43 or an additional hub on the input shaft 22 of the transmission (i.e., on the output shaft of the turbine 4 shown in FIG. 1). The meshing internal and external gears are preferably designed to perform a self-centering action. Such self-centering action can be achieved in that the tooth flanks of one or both gears, such as the flanks of internal teeth on the element 27 or 28, cause the respective element to have its center coincide with the center of the hub 43 as soon as the cooperating parts 27, 43 or 28, 43 are caused to transmit torque.

In accordance with a modification, the profiling 49 or a profiling between the input element 28 and the hub 43 or another hub can be selected in such a way that it resembles or constitutes a standard multitooth profile having a homogeneous cross-section, as viewed in the direction of the axis 3, with a single exception, namely with at least one raised portion. For example, a series of raised portions can be arranged to be repeated cyclically in the circumferential direction of the profile. The advantage of such profiling is that, in spite of its seeming complexity, it is not more expensive than conventional multitooth profiles. Moreover, the multitooth profile can be achieved, with a very high degree of precision, by resorting to available and relatively simple machinery, e.g., to a broaching machine.

Since, and as presently advised, the improved torque converter is intended primarily for use in vehicles, especially in the power trains of motor vehicles, it is intended to be produced in huge quantities. Therefore, the cost involved in obtaining and utilizing a broaching machine for the making of the aforediscussed multitooth profile(s) does not unduly affect the overall cost of the torque converter, power train and/or motor vehicle.

It is also within the purview of the present invention to produce one or more parts of the improved, torque converter (such as the inner and/or outer elements of the turbine damper) in a stamping machine. This ensures a satisfactory finish of the internally located profiling(s) of such parts at a reasonable cost.

As already mentioned hereinbefore, and as known from the field of turbine dampers for motor vehicles, such a damper is assembled of several groups or subassemblies at least some of which must be assembled separately, i.e., independently of each other. For example, when the parts of the bypass clutch 7 are inserted into the housing 2 of the torque converter 1, such operation is followed by insertion of at least one hub (e.g., the hub 43) prior to insertion of the input element 22 of the transmission, and insertion of such hub is followed by installation of the turbine damper 26 together with the turbine shell 40 which is or which can be already secured to the damper. During manipulation of the turbine damper, together with a hub which is or which can be already inserted into it, the hub (which is axially movable in the damper), could fall out of the output element (such as 27) of the damper. In order to avoid or prevent such undesirable displacement of the hub, the configurations of the hub and the turbine damper are selected in such a way that, prior to final assembly of the torque converter, the hub and the damper remain properly assembled with each other. This is accomplished by the provision of the aforementioned safety device which prevents a loss of the hub. The improved torque converter can employ any one of a number of different loss-preventing or misplacement-preventing safety devices. Thus, the device 46 of FIG. 1 constitutes but one of several acceptable safety devices but is presently preferred owing to its simplicity, compactness and low cost. Thus, the dimensions of the input element 28 of the turbine damper 26 are simply selected in such a way that this element extends radially inwardly at least slightly beyond the radially outermost portion of the hub 43. It is not even necessary that the entire radially innermost portion of the input element 28 extend inwardly beyond the radially outermost part of the member 43.

The transmission of hydrokinetic energy (i.e., of energy of the turbine 4) to the hub (such as 43) on the input shaft 22 of the transmission (such as an automatic transmission) can be achieved by resorting to a component part which need not be treated, or need not be treated or finished exclusively, in a material removing machine. For example, such component part can resemble a plate and can constitute a stamping. Alternatively, such component part can be, made of sintered metal, preferably steel, in a suitable shaping or forming machine, e.g., it can constitute a molding or casting which is obtained at least substantially without removal of material from a blank. An advantage of sintered parts is that they can be, shaped in a suitable mold or the like with a very high degree of precision and can exhibit a desirable high stability during the entire useful life of the torque converter. A secondary treatment (i.e., a treatment following the molding operation) is not required, at least in many or most instances. Such secondary treatment might be required when the manufacturer desires that the component part exhibit an exceptionally high surface finish and dimensions which match or depart only negligibly from ideal dimensions. In fact, it might even be desirable to shape the component part in such a way that its dimensions exceed (to a predetermined extent) the optimum dimensions; this accounts for actual or potential shrinkage during sintering or another treatmentent entailing ascertain reduction of one or more dimensions of the workpiece.

Sintered component parts exhibit the additional important advantage that they, or certain portions thereof, can be imparted a highly complex shape without any appreciable additional or special treatment (such as external profiling involving, for example, the making of axially extending lobes, pins, studs and/or other protuberances). Heretofore, it was customary to make a hub or an analogous guiding, supporting, locating and/or arresting part for use in a turbine damper by resorting to a drop forging technique. The thus obtained rough blank or forging was thereupon subjected to at least one secondary treatment such as, for example, turning and/or broaching, which invariably contributes significantly to the cost of the component part.

For example, the just discussed component part can constitute a simple ring or another annular element which is utilized to properly locate the shell (such as 40) of a turbine (4) in the housing (2) of a torque converter and can be provided with one or more cams, lobes or the like. Heretofore, such parts were made in drop forging machines. The making of such component parts in a heretofore customary manner constituted a costly undertaking because it was preferably or necessarily followed by at least one material removing operation such as turning, e.g., to properly finish a surface which is provided with one or more projecting cams and/or other protuberances. These protuberances can serve as stops against excessive angular movements and/or as a means for limiting the respective component part and/or one or more neighboring parts to predetermined (such as relatively minor) angular and/or other displacements.

The hub (such as the part 43 in the torque converter 1 of FIG. 1) which serves to transmit torque to the input element (such as 22) of the assembly receiving torque from the output element (27) of a turbine damper or the like is normally a dynamically balanced (rotationally symmetrical) part. Therefore, it can be readily machined in a lathe or another turning machine as well as by the needle or an analogous tool of a broaching machine. However, even such hub can be mass-produced of sinter metal (such as steel) in a simpler and less expensive manner by resorting to a shaping or forming rather than a material removing technique.

All such parts of the embodiments shown in FIGS. 2 to 14*b* which are identical with or plainly analogous to the corresponding parts of the torque converter 1 shown in FIG. 1 are denoted by similar reference characters, and will be described only to the extent which is necessary for a full understanding of the respective embodiments.

Figure 2:
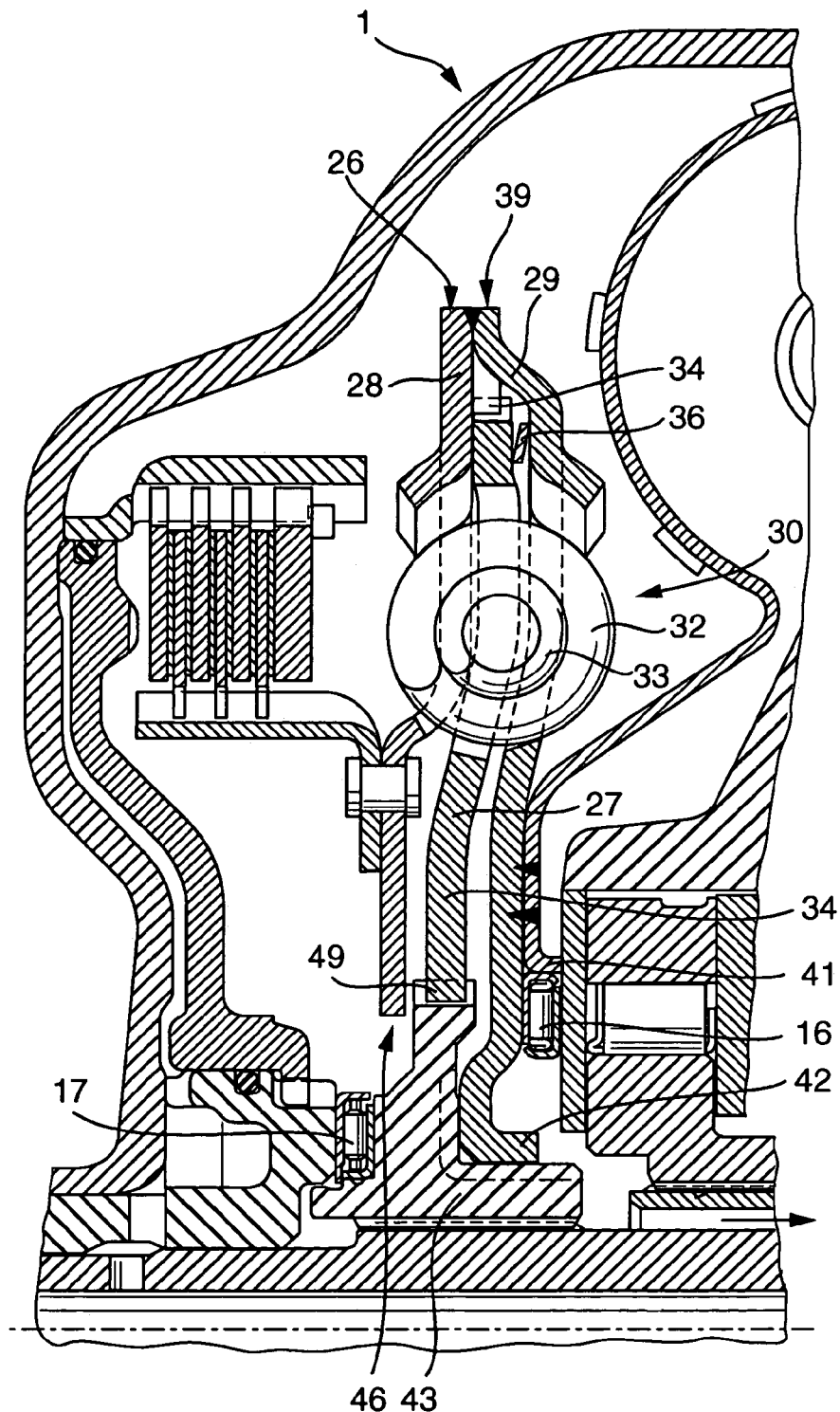
FIG. 2 is a fragmentary axial sectional view of a second torque converter wherein the radially outermost portion of one of the input elements is different from the outermost portion of the corresponding input element in the turbine damper forming part of the torque converter shown in FIG. 1.

The radially outermost portions of the input elements 28, 29 shown in FIG. 2 are similar to those illustrated in FIG. 1 and are again connected to each other by a welded joint 39. A difference is that the radially outermost portion of the output element 29 extends radially outwardly and lies at least substantially flush against the adjacent side of the input element 28. Such configurations were customary in conventional turbine dampers wherein the radially outermost portions of the input elements were riveted to each other. It has been found that the outer diameter of the turbine damper which is shown in FIG. 2 can be smaller than the outer diameters of conventional dampers; this is attributable to the provision of the welded joint or seam 39 in lieu of a circular array of rivets.

Another difference between the embodiments of FIGS. 1 and 2 is that, in FIG. 2, the abutments 34 are located radially outwardly of the coil springs 32, 33 (i.e., not in the radially inner portion of the turbine damper 26). These abutments are obtained as a result of suitable deformation (such as stamping) of corresponding portions of the input elements 28, 29 of the turbine damper 26. The profiling 49 is arranged in the same way as in the torque converter 1 of FIG. 1, i.e., between the radially outermost portion of the hub 43 and the radially innermost portion of the output element 27 of the damper 26. The inner diameter of the left-hand input element 28 is again selected in such a way that it provides a loss-preventing safety device 46.

Figure 3:
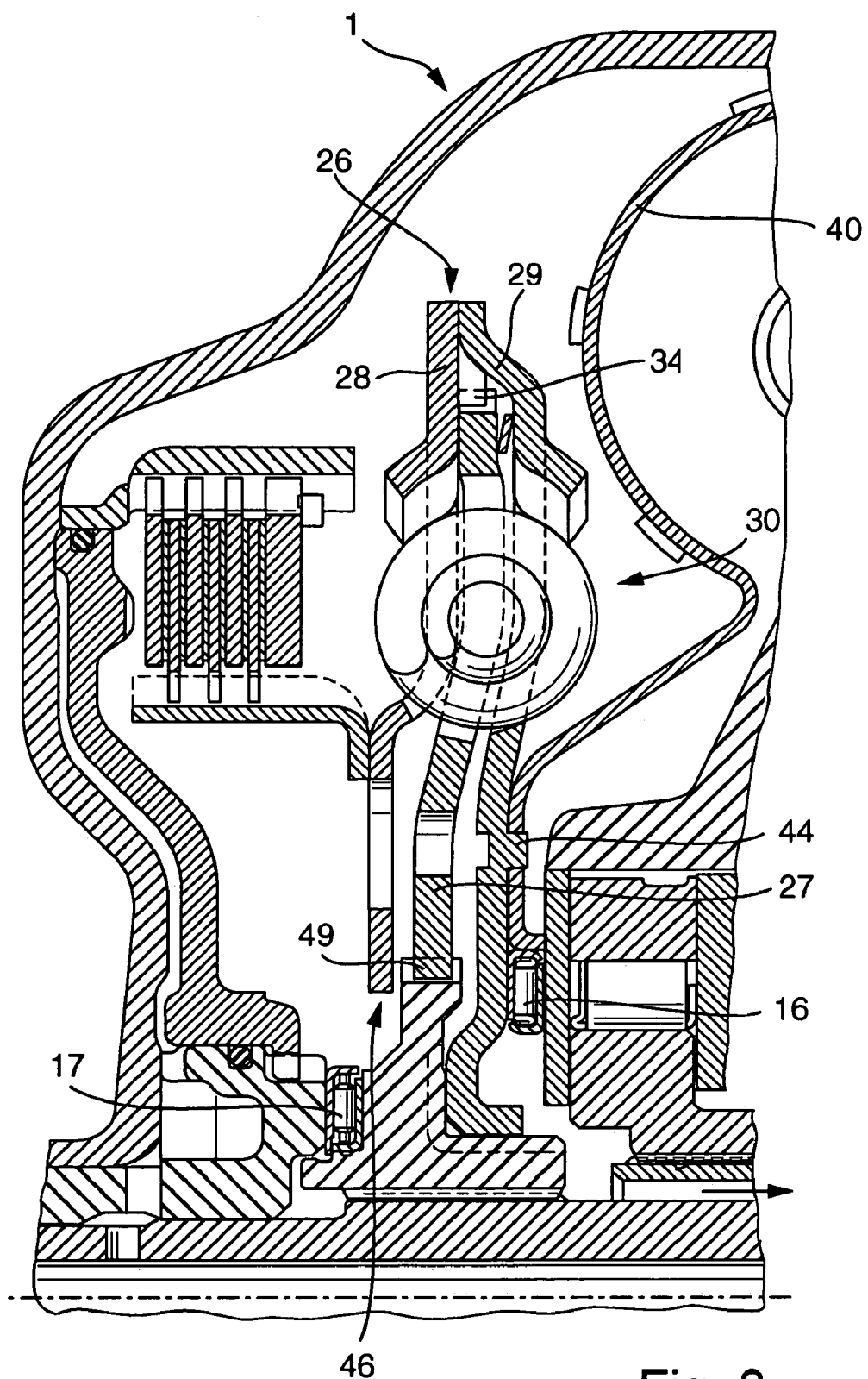
FIG. 3 is a similar fragmentary axial sectional view of a third torque converter wherein one of the input elements of the turbine damper is riveted to the shell of the turbine.

In the torque converter of FIG. 3, the shell 40 of the turbine is not welded to the right-hand input element 29 of the turbine damper. The connection between these parts includes so-called riveting warts 44 or analogous protuberances. Since a riveting operation involves the utilization of two tools which act in opposite directions and one of which must be located inside the turbine shell 40, proper placing of the other riveting tool subsequent to assembly of the damper 26 necessitates the provision of recesses, notches or cutouts in the left-hand input element 28 as well as in the output element 27 of the damper. However, such work (i.e., the making of recesses, notches or cutouts) can be avoided if the right-hand input element 29 is connected (such as riveted) to the shell 40 in a first step and the turbine damper 26 is fully assembled in one or more next-following steps. The last step can include connection of the radially outermost portions of the input elements 28, 29 to each other. FIG. 3 shows that the damper 26 which is depicted therein need not employ a welded seam 39 between the radially outermost portions of the input elements 28, 29. Furthermore, the radially outermost portions of the input elements 28, 29 shown in FIG. 3 need not be riveted to each other, either by resorting to standard rivets (such as 38 in FIG. 1) or to warts (such as 44 shown in FIG. 3). Since the areas of contact of the radially outermost portions of the input elements 28, 29 of FIG. 3 with each other are relatively large, such radially outermost portions can be bonded to each other, e.g., by resorting to a suitable adhesive.

Figure 4:
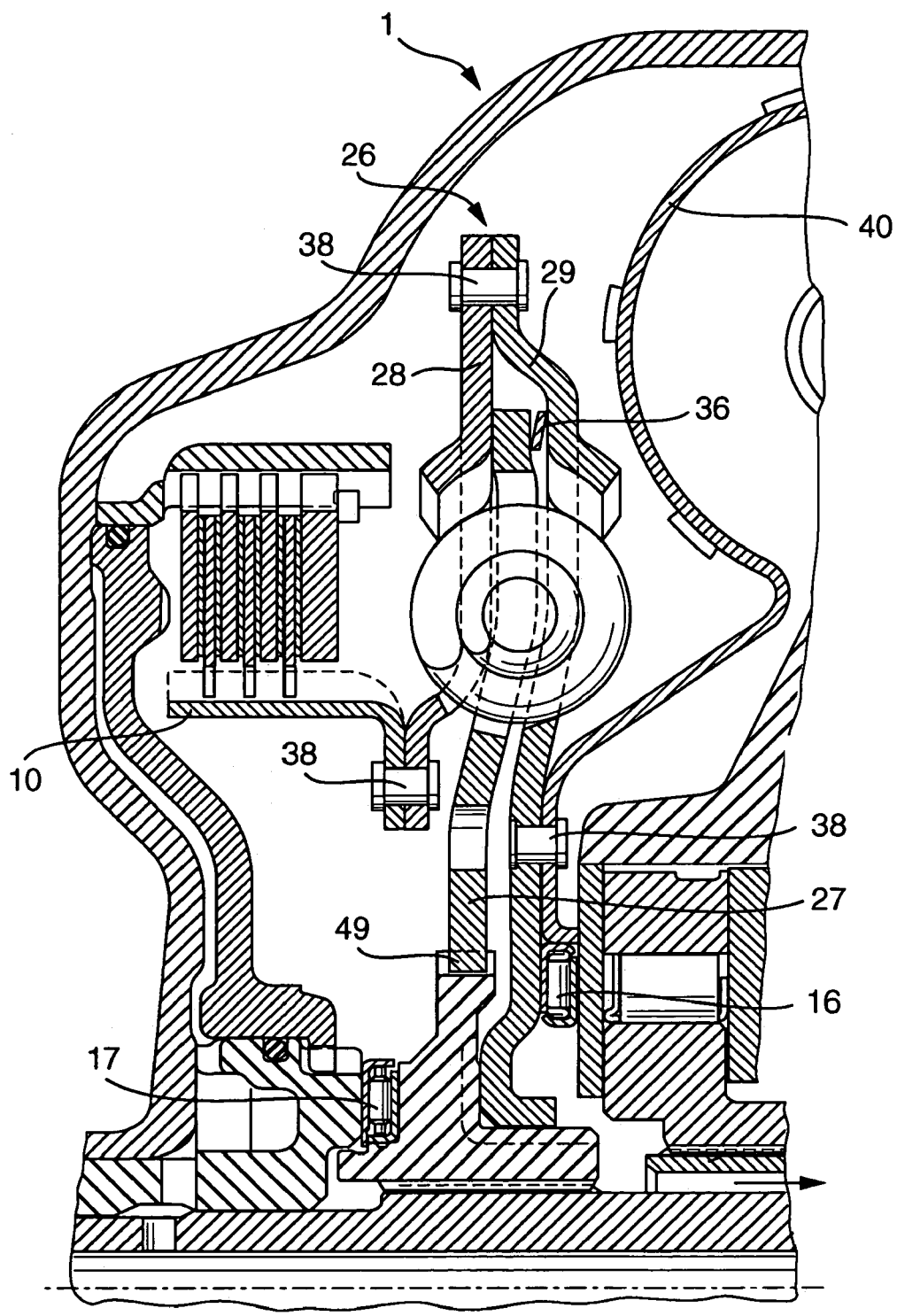
FIG. 4 is a view corresponding to that of FIG. 3 but showing a different riveted connection between one of the input elements of the turbine damper and the turbine shell.

In the torque converter 1 of FIG. 4, the shell 40 of the turbine and the right-hand input element 29 of the turbine damper 26 are secured to each other by rivets 38 which replace the warts 44 of the type shown in FIG. 3. FIG. 4 further illustrates that rivets 38 are employed to secure the radially inner lamination carrier 10 to the left-hand input element 28 of the turbine damper as well as to secure the radially outermost portions of the input elements 28, 29 to each other. Thus, the torque converter 1 of FIG. 4 employs a single type of connector means, namely the rivets 38. This contributes significantly to lower cost of the respective torque converter 1.

An advantage of the embodiment which is shown in FIG. 4 is that the shell 40 of the turbine 4 need not be bonded to but is merely form-lockingly connected with the right-hand input element 29 of the turbine damper 26 by rivets 38. This connection exhibits the advantage that it need not be preceded by extensive precision treatment of the parts which are to be riveted to each other. Al that is necessary is to provide the parts 29 and 40 with holes of requisite size.

The warts 44 (one of which is shown in FIG. 3) exhibit similar advantages, i.e., a relatively simple preliminary work. In fact, the making of warts 44 is even simpler than the insertion of rivets 38 because only one of the parts which are to be secured to each other by warts must be provided with holes. Moreover, the utilization of rivets necessitates the insertion of rivets into prefabricated holes and a deformation of the rivet heads. Once the shell 40 is provided with a requisite number of holes and is properly positioned relative to the output element 29, the latter is simply deformed to shift tongue-like portions (warts) thereof into the adjacent holes of the shell. If desired, the thus displaced tongues of connections 44 shown in FIG. 3 are thereupon upset by resorting to a pressing operation. It is also possible to secure the parts 40, 29 to each other by resorting to several types of connecting means, e.g., to rivets 38 and to warts 44.

If certain parts of the improved torque converter are simply bonded to each other, e.g., when they are in substantial surface-to-surface contact with one another, this entails additional savings in time and cost. For example, a suitable adhesive or a soldering operation can suffice to bond the radially outermost portions of the input elements 28, 29 in the torque converter of FIG. 3 to each other. Such mode of connecting certain parts to each other does not require the making of holes in the respective parts. The making of holes is likely to entail at least some undesirable deformation of the respective parts.

Welding of certain parts, such as 28 and 40, to each other also exhibits numerous advantages. For example, it is not necessary to utilize additional substances (such as an adhesive or solder) if the selected parts are simply welded to each other; this might require the utilization of a weldant which, however, can have a composition similar to or identical with that of the part 40 and/or 28. The welding operation can involve a spot welding, a laser welding, a resistance welding or a friction welding operation. At least some of these welding operations can be carried out without involving the utilization of any additional materials or substances.

Figure 5:
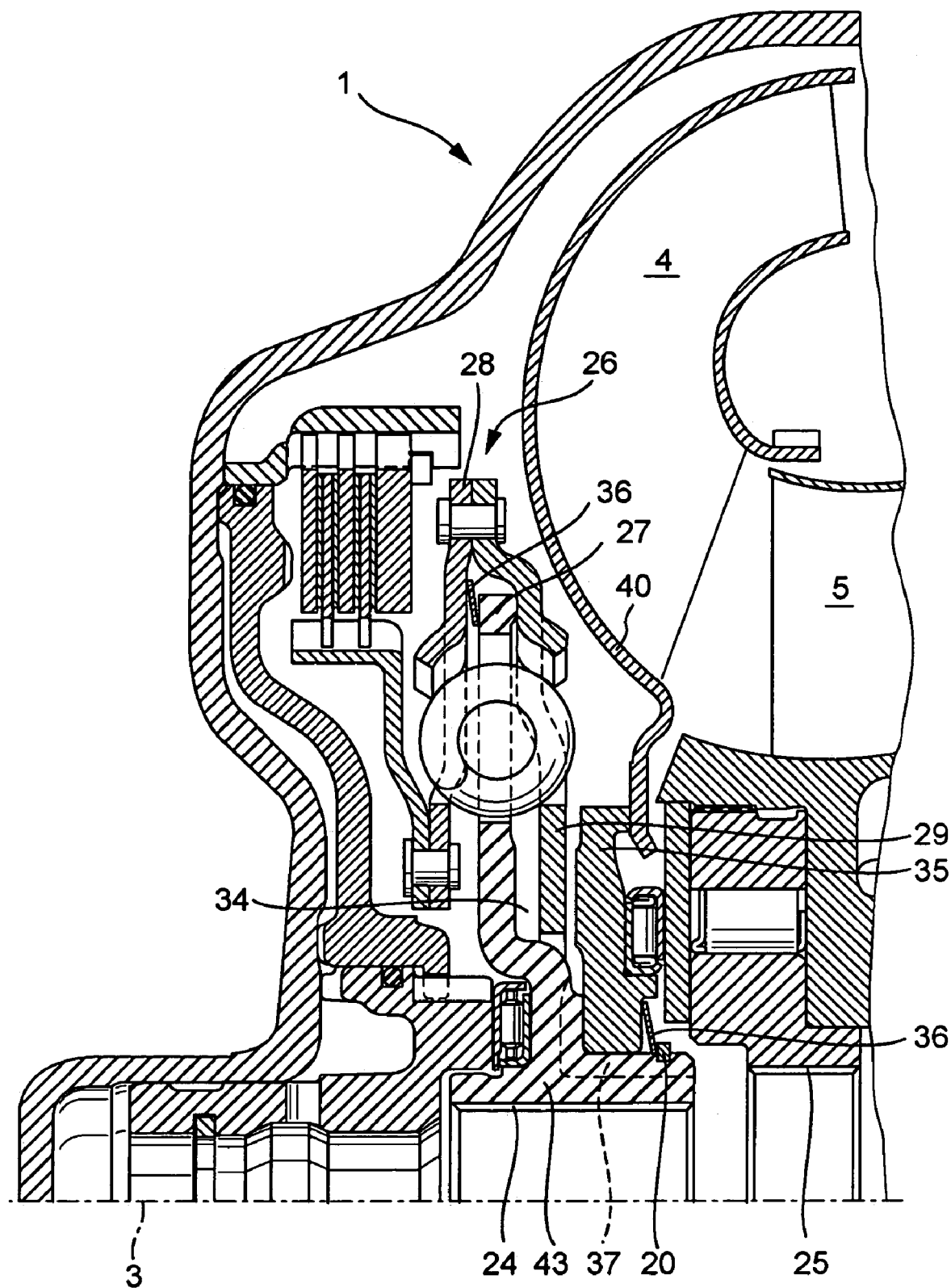
FIG. 5 is a fragmentary axial sectional view of a further torque converter wherein a resilient tensioning element is arranged to operate between two hub-shaped components respectively carrying an output element of the turbine damper and the shell of the turbine.

As already mentioned hereinbefore, the turbine damper 26 of the improved torque converter 1 can employ at least one axial biasing element 36 (such as a diaphragm spring or a resilient undulate washer) which reacts against at least one of the input elements 28, 29 of the damper and bears upon the output element 27 to damp eventual torsional vibrations. As shown in FIG. 5, a torsional vibration damping element 36 can also be installed between the support 35 for the turbine shell 40 and the hub 43 for the support 35. This damping element 36 reacts against a ring 20 which surrounds and is partly recessed into the hub 43. The purpose of the just discussed element 36 is to damp torsional vibrations which could develop due to the ability of parts 35 (which is a support for the shell 40) and 43 to rotate relative to each other. The frictional forces which are generated by the tensioning element 36 at the ring 20 entail an absorption of vibration or oscillation energy.

FIG. 5 further shows that a similar or identical axial biasing element 36 can be installed to operate between the input element 28 and the output element 27 of the turbine damper 26. Still further, and as shown in FIG. 6, a similar or analogous biasing element 36 can be installed to act at the radially outermost portion of the support 35 and the right-hand input element 29 of the turbine damper 26.

Figure 6:
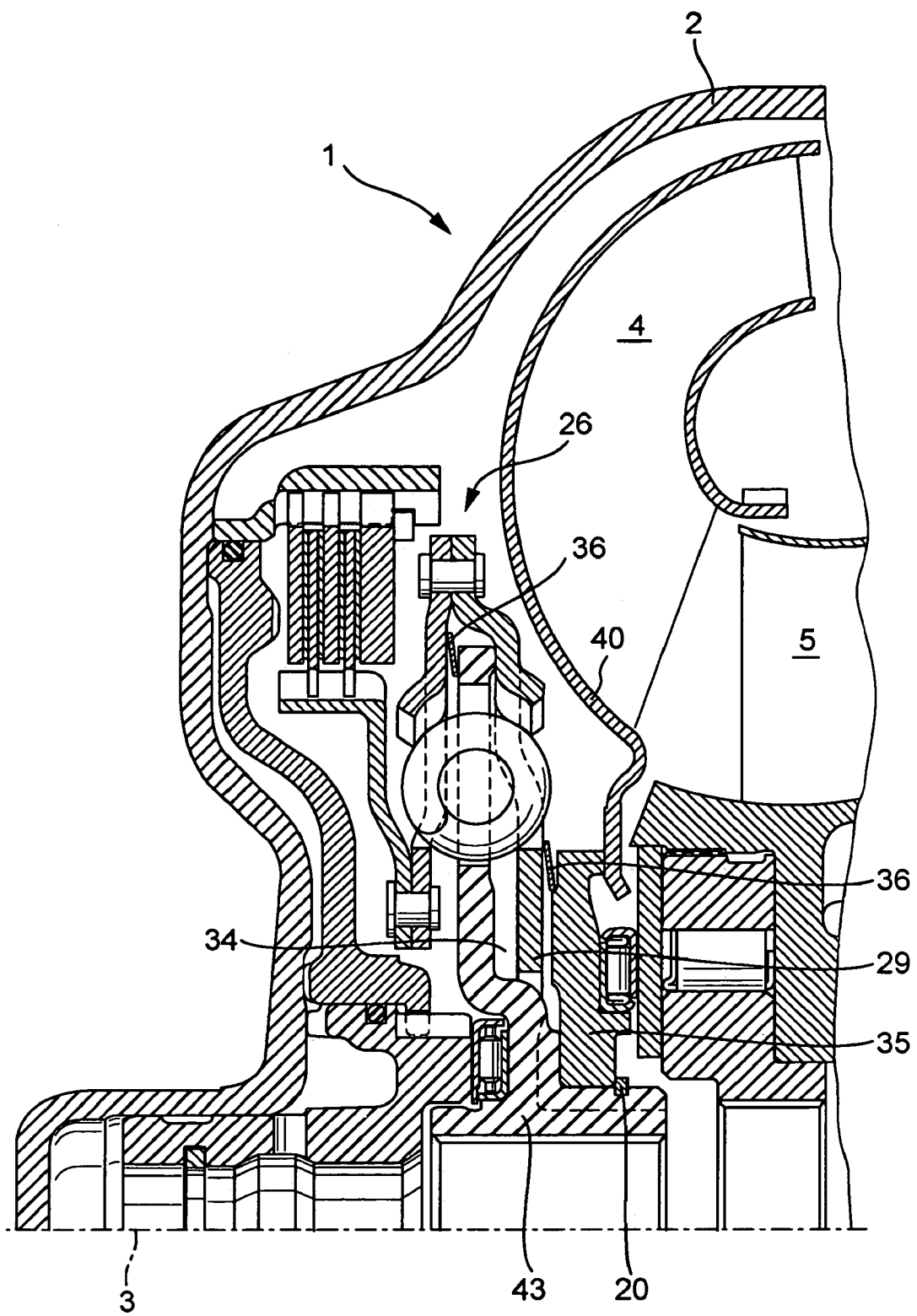
FIG. 6 is a fragmentary axial sectional view of a torque converter constituting a modification of that which is shown in FIG. 5.

The torque converters 1 of FIGS. 5 and 6 exhibit two common features. The first such common feature is that the shell 40 of the turbine 4 is welded to the hub 35. The presently preferred welding procedure is that known as friction welding. However, and since the shell 40 is not welded to the right-hand input element 29 (as in FIG. 1 or 2), and since the support 35 merely includes a projection or abutment 34 (shown by broken lines) which extends into the damper 26, the turbine 4 and the hub 35 are not guided axially prior to installation of the turbine in the housing 2 of the torque converter 1. Therefore, the embodiments of FIGS. 5 and 6 must employ the axial safety ring or securing ring 20 which secures the hub 35 to the hub 43. The second, feature common to the embodiments of FIGS. 5 and 6 is that the hub 35 is not formed in a drop forging machine (as is customary for the making of similar parts for use in conventional torque converters) but is a sintered part which is preferably made of sintered steel. Such part is made in a molding or other suitable shaping or forming machine. The reason is that the hub 35 of FIG. 5 or 6 cannot be readily made in a material removing finishing machine which would have to be employed if the part 35 were made in a drop forging machine. For example, the left-hand side of the hub 35 cannot be treated in a face turning or facing machine because this side exhibits the projection(s) or abutment(s) 34.

Figure 7:
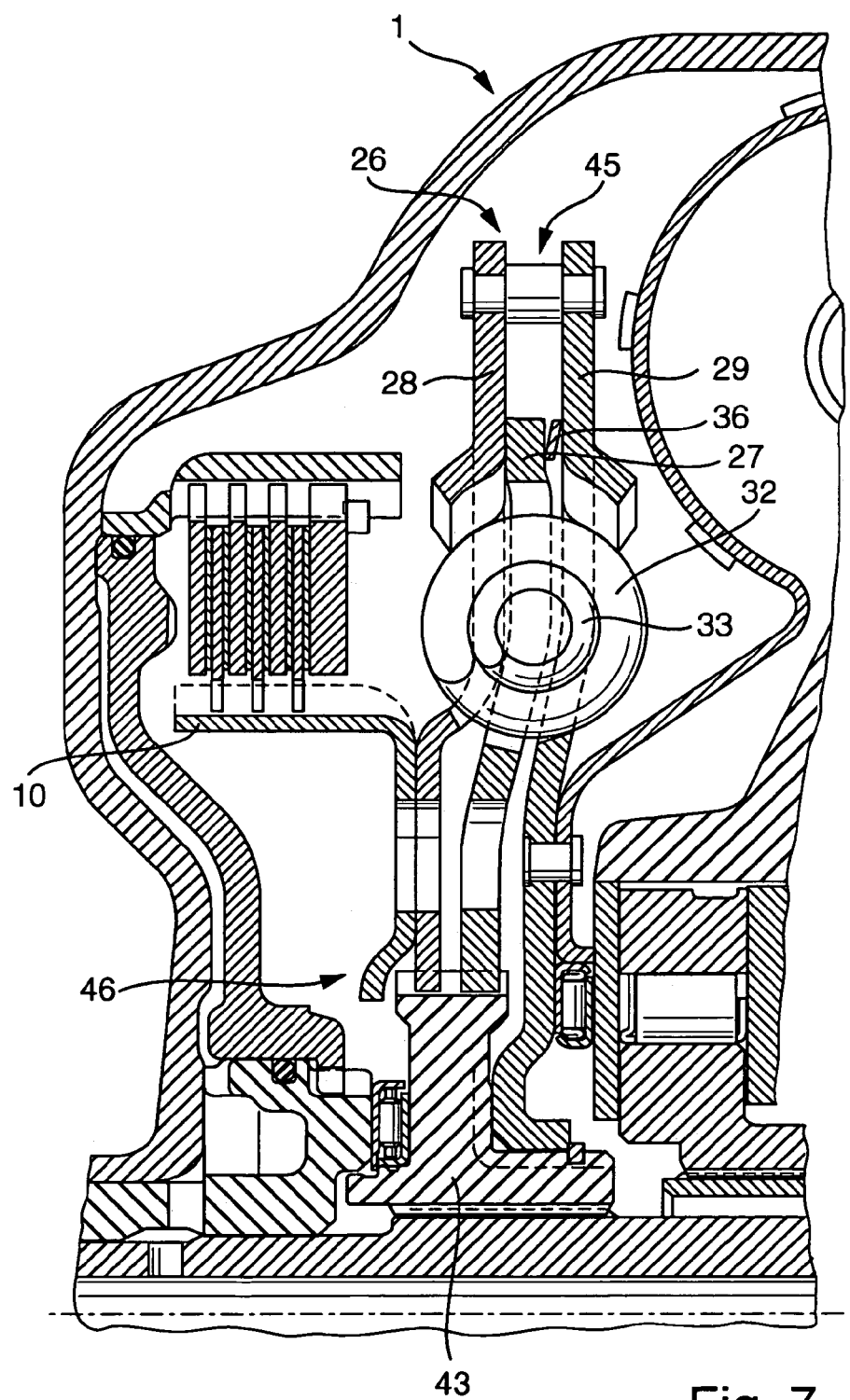
FIG. 7 is a fragmentary axial sectional view of a torque converter which constitutes a further modification of those shown in FIGS. 1 to 6.

In the torque converter of FIG. 7, the radially outermost portions of the input elements 28, 29 forming part of the turbine damper 26 are secured to each other by rivet-shaped distancing elements 45 which are dimensioned to afford requisite space for the output element 27 and for the axial biasing element 36. The radially outer portions of the input elements 28, 29 can be mirror images of each other and can be at least basically flat and parallel to each other. An advantage of the distancing elements 45 is that they ensure that the radially outermost portions of the input elements 28, 29 are maintained at an optimum distance from each other. Such distance can be readily selected in a manner to ensure that the elements 28, 29 allow for an optimum circulation of oil or another suitable hydraulic fluid through the interior of the turbine damper 26. This fluid can flow along the surfaces of the output element 27 and the axial biasing element 36 as well as along the inner sides of the input elements 28, 29.

FIG. 7 further shows a different mode of coupling the output element 27 of the turbine damper 26 to the left-hand input element 28. The exact details of one of the presently preferred embodiments of coupling means between the elements 27 and 28 are shown in FIGS. 8 and 9.

Still further, FIG. 7 shows a safety device 46 which is established because of the relatively small inner diameter of the inner lamination carrier 10, i.e., such inner diameter is smaller than the outer diameter of the hub 43.

Figure 8:
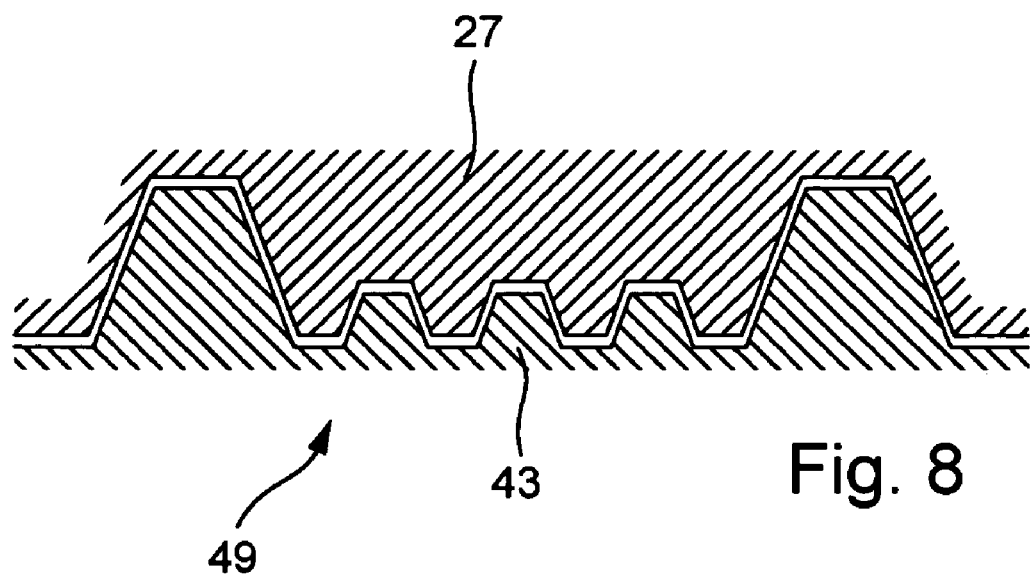
FIG. 8 is an enlarged fragmentary radial sectional view of cooperating portions of the output elements of the turbine damper and a hub in the torque converter of FIG. 7.
Figure 9:
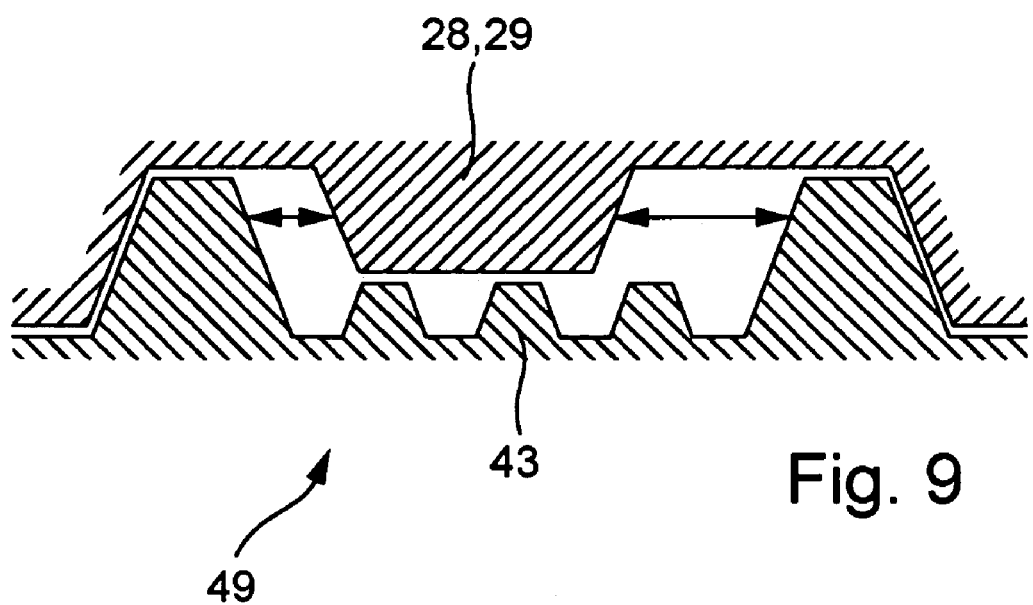
FIG. 9 is a similar fragmentary radial sectional view of the input elements of the turbine damper and a hub in the torque converter of FIG. 7.

FIG. 8 is an enlarged fragmentary radial sectional view of neighboring portions of the output element 27 and the hub 43, and FIG. 9 is a similar radial sectional view of neighboring portions of the hub 43 and input elements 28, 29 of the turbine damper 26 shown in FIG. 7. The planes of sections shown in FIGS. 8 and 9 are normal to the longitudinal axis of the hub 43. The views of FIGS. 8 and 9 are slightly distorted because the sections appear to be straight (as viewed from the left to the right) rather than arcuate; this is attributable to the relatively small portions of the parts 24, 43 and 28, 29, 43 which are respectively depicted in FIGS. 8 and 9.

The illustrated profiles 49 have essentially constant cross-sections, as viewed in the axial direction; this is the reason that the profile of the hub 43 shown in FIG. 8 is identical to that of the hub 43 which is shown in FIG. 9. The profile of the output element 27 shown in FIG. 8 is complementary to that of the hub 43; consequently, the output element 27 is essentially non-rotatably mounted on the hub without any or practically without any play. The differently dimensioned cyclically repeating or recurring "teeth" of the profiles 49 between the hub 43 and the output element 27 of FIG. 8 are desirable but not required or critical.

In FIG. 9, the hub 43 is paired with the input element(s) 28, 29. The "teeth" of the input element(s) are shorter (as seen in the radial direction) than the "teeth" of the hub 43 and, therefore, they do not actually mate with the smaller teeth of the hub. In addition, and since the "teeth" of the input element(s) 28, 29 are "smaller", the "flanks" of such teeth are normally out of contact with the "flanks" of the hub 43. In view of the just discussed configurations and dimensions of the "teeth", there is established a predetermined or preselected play between the input element(s) 28, 29 and the hub 43. The input elements 28, 29 must have a predetermined play relative to the output element 27 of the turbine damper 26 (this is necessary in order to properly damp torsional vibrations), and (in order to protect the resilient elements, such as the coil springs 32, 33 shown in FIGS. 1 to 4 and 7, against excessive stressing) the input elements 28, 29 must also prevent excessive angular movements thereof relative to the output element 27. It has been ascertained that the arrangements which are shown in FIGS. 8 and 9 are, highly satisfactory to meet such requirements. Thus, the profile 49 of FIG. 9 constitutes an ideal or at least a highly satisfactory solution of the aforediscussed problems concerning a cooperation between the hub 43 and the elements 27, 28, 29 of the turbine damper 26, not only as concerns the compactness but also as regards the reliability, the longevity, the simplicity and other desirable qualities of the stop (34) and the turbine damper 26.

Figure 10:
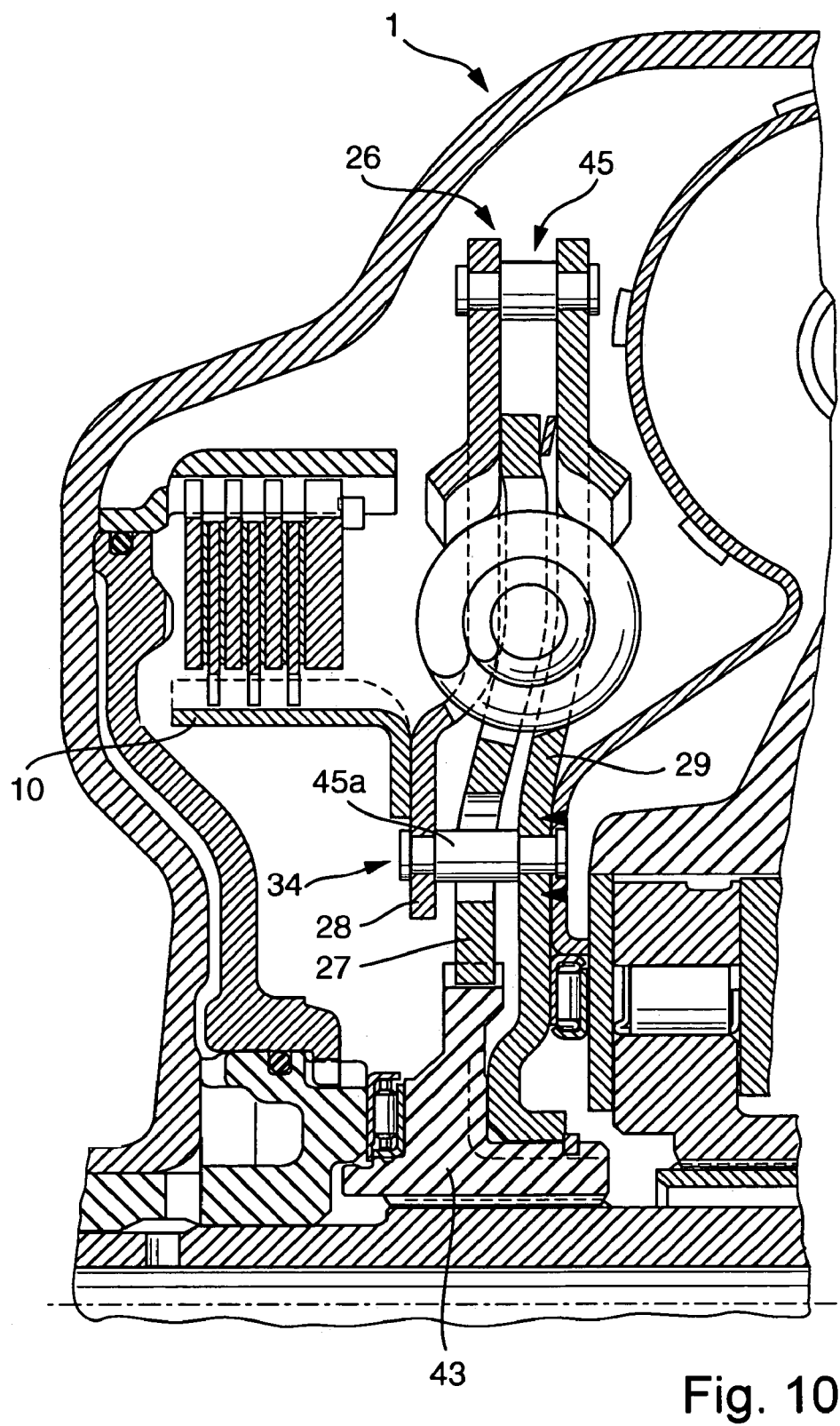
FIG. 10 is a fragmentary axial sectional view of a torque converter wherein the input elements of the turbine damper are spaced apart from each other and are coupled to one another by rivet-shaped distancing elements.

FIG. 10 shows a portion of a torque converter having a turbine damper 26 which also employs several distancing elements 45 (only one shown) in the form of bolts which are or which can be identical with the similarly referenced bolt 45 of FIG. 7. The damper 26 of FIG. 10 further employs an abutment or stop 34 which can be constituted by one (45a) of the distancing elements 45. The diameters of end portions of each distancing element (or at least of the element 45a) are reduced so that they form shoulders arranged to abut the internal surfaces of the input elements 28, 29. By upsetting the outermost ends of the bolts 45, 45a (i.e., by imparting thereto shapes corresponding to those of rivet heads), one obtains a strong connection with the input elements 28, 29, i.e., a connection which is compact but can stand pronounced stresses.

In addition, at least one distancing element (45, 45a) of the just described character can be arranged to enter an arcuate circumferentially extending recess or groove of the output element 27; this enables the distancing element to perform the function of the aforesaid abutment or stop 34, i.e., to limit the extent of angular movability of the input elements 28, 29 and of the output element 27 relative to each other.

Figure 11:
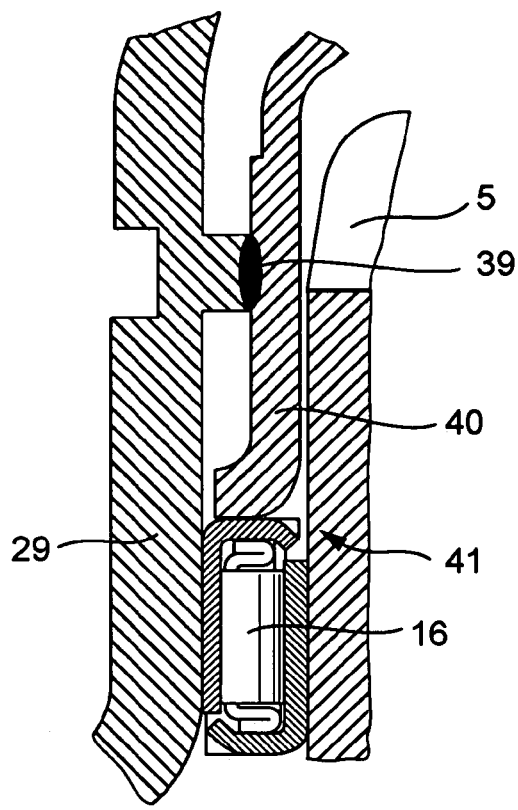
FIG. 11 is a fragmentary axial sectional view taken in a torque converter wherein one input element of the turbine damper is secured to the turbine shell in a different way.

FIG. 11 shows a portion of the right-hand input element 29 in the turbine damper of a further turbine adjacent a stator or guide wheel 5 with a shell 40 interposed between the turbine and the stator. The shell 40 has a collar 41 which extends in a direction to the left, i.e., away from the stator 5, and is radially outwardly adjacent a needle bearing 16. The latter surrounds a portion of the aforediscussed support 35, e.g., in a manner as shown in FIG. 5. In order to impart to the collar 41 of FIG. 11 an optimum orientation, the adjacent portion of the input element 29 of the damper for the turbine is provided with one or more suitable cutouts or recesses and/or one or more suitable protuberances which are adjacent the shell 40 of the turbine. The character 39 denotes in FIG. 11 a welded seam (e.g., one of two or more welded seams) which fixedly secures the input element 29 to the shell 40 of the turbine. The seam 39 of FIG. 11 is preferably formed in a resistance welding machine.

Figure 12:
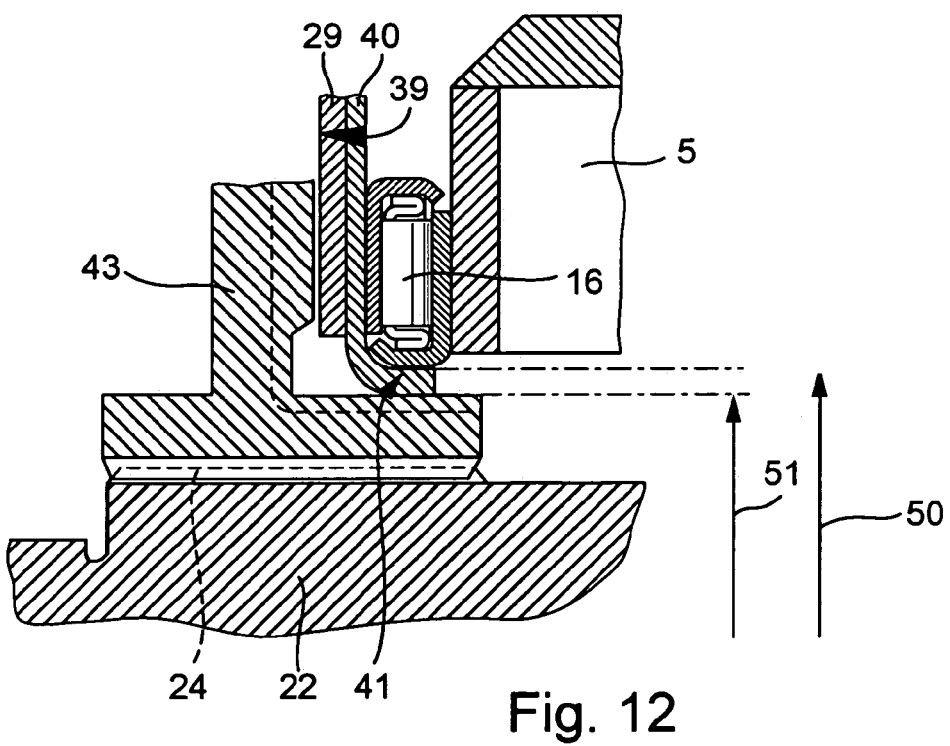
FIG. 12 is a fragmentary axial sectional view of a torque converter wherein a modified turbine shell is welded to an input element of the turbine damper.

Referring to FIG. 12, there is shown a different radial support for the turbine of the improved torque converter, namely a support other than the input element 27 of the damper. In this embodiment of the present invention, such function is performed by the shell 40. To this end, the shell 40 extends radially inwardly to the radially outer side of the hub 43 and is provided with a collar 41 which surrounds the adjacent portion of the hub 43. The inner diameter 51 of the collar 41 of the shell 40 is closely adjacent the outer side of adjacent portion of the hub 43, and the needle bearing 16 surrounds the collar 41, i.e., the inner diameter of this bearing exceeds the inner diameter 51 of the collar 41 of the shell 40 and approximates the outer diameter 50 of the collar. Since the output element 29 is guided by the shell 40 (as seen in the radial direction), the embodiment of FIG. 12 need not be provided with any separate or additional radial bearing means.

Figure 13:
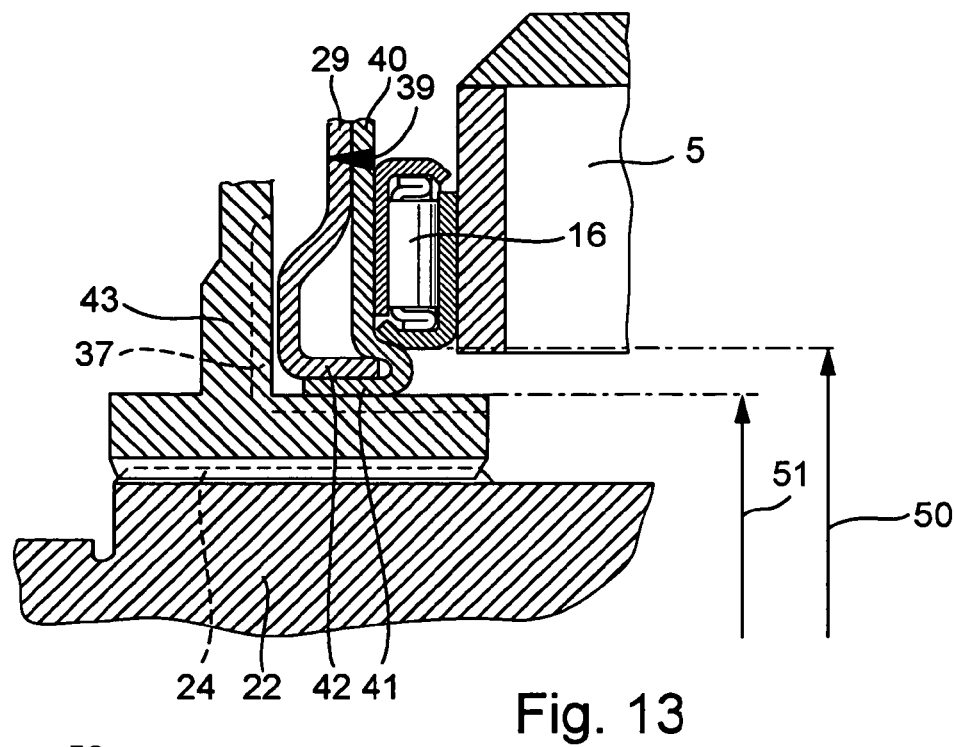
FIG. 13 illustrates a modification of the structure which is shown in FIG. 12.

FIG. 13 illustrates a modification of the torque converter which is shown in FIG. 12. The collar 41 of the housing or shell 40 is radially inwardly adjacent a collar 42 of the right-hand input element 29 of the turbine damper and is configurated in such a way that it includes portions adjacent the right-hand side and a portion of upper side of the collar 42 prior to extending radially outwardly, i.e. away from the turbine shaft 22 and along and beyond the left-hand side of the needle bearing 16 between the parts 5 and 40. The outer diameter 50 of the collar 41 equals or is only slightly less than the inner diameter of the needle bearing 16; in addition, the collar 41 serves to locate the collar 42 radially inwardly, radially outwardly and in a direction to the right, as viewed in FIG. 13. A welded seam 39 is provided to secure the radially outwardly extending portion of the shell 40 to the adjacent portion of the right-hand input element 29 of the turbine damper in the torque converter including the structure of FIG. 13. Thus, the part 40 shares the angular movements of the part 29, i.e., the damper must rotate with the shell of the turbine in the housing of the torque converter. The interfitted collars 41, 42 exhibit the advantage that, during the initial stage of assembly of the torque converter embodying the structure of FIG. 13, the turbine including the shell 40 can be installed concentrically or coaxially with the damper including the input element 29 in a surprisingly simple and time-saving manner.

Figure 14A:
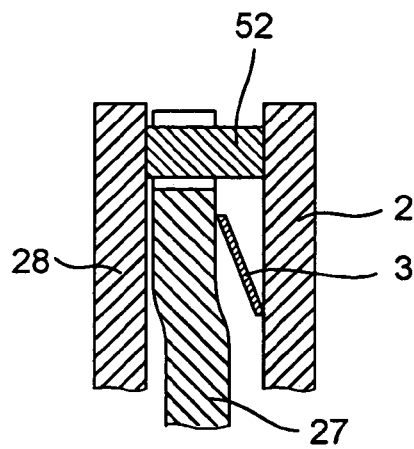
FIG. 14a is a fragmentary sectional view of the radially outermost portion of a further turbine damper, the section being taken in the direction of arrows as seen from the line XIVa—XIVa in FIG. 14b.
Figure 14B:
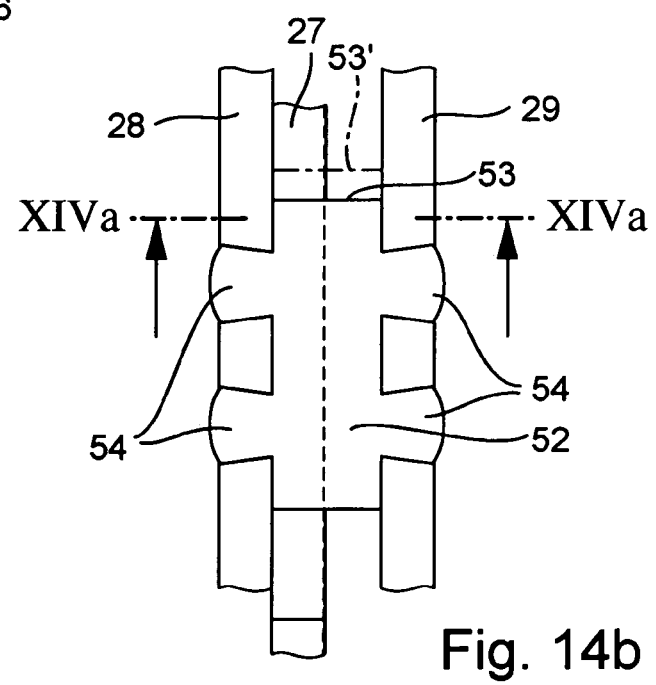

FIGS. 7 and 10 show the bolt-shaped distancing elements 45 between the radially outwardly extending outermost portions of the input elements 28, 29 forming part of the turbine damper 26. As already described hereinbefore, these bolts ensure that the input elements 28, 29 are reliably held at an optimum axial distance from each other and provide adequate room for certain additional parts of the damper (such as the output eleent 27 and one or more axial biasing elements 36). FIGS. 14a and 14b show distancing elements 52 which are preferably made of a metallic sheet material. In FIG. 14a, a portion of the damper is shown in a radial sectional view and FIG. 14b is a plan view of such portion of the damper.

The sheet- or plate-like distancing element 52 has plane parallel surfaces which are adjacent the inner (confronting) sides of the input elements 28, 29. These inner sides of the input elements 28, 29 are provided with cutouts or recesses or slots for the respective projections or plugs or studs 54 of the sheet- or plate-like distancing element 52. In order to prevent axial movements of the input elements 28, 29 away from each other, the plugs 54 are caulked to the adjacent portions of the input elements 28, 29. Similar results can be obtained by employing substantially dovetailed prefabricated plugs 54 (this can be seen in FIG. 14b) to replace or in addition to caulking.

In accordance with a modification, the plugs 54 and their recessed ends are not dovetailed but exhibit a rectangular or square outline. This brings about the advantage that the input elements 28, 29 and the plate-like distancing element 52 can be produced at a greatly reduced cost, e.g., in a stamping machine. In order to enhance the axial stability of the combination of elements 28, 29 and 52 which are provided with square or rectangular plugs and recesses, such plugs are preferably upset so that the material of the distancing element 52 is pressed into the input elements 28, 29 and/or vice versa, that such parts are hooked to each other and/or that the plugs are provided with portions acting not unlike rivet heads or the like.

An important advantage of the sheet-metal distancing element 52 is that its front faces 53, 53' can serve as abutments which determine the maximum permissible angular displacements of the input elements 28, 29 and the output element 27 of the turbine damper. Furthermore, the length of the sheet-like distancing element 52 (as seen transversely of the abutment surfaces 53, 53' shown in FIG. 14b) determines the maximum possible angular displacement. Otherwise stated, one can mainly employ standard parts for the input and output elements of the turbine dampers having different sizes; it is merely necessary to utilize one differently dimensioned part for each of two or more different turbine dampers, i.e., for each of two or more dampers wherein the extent of angular displacement departs from that in the other type or types.

It is further clear that sheet- or plate-like distancing elements 52 need not necessarily serve as abutments. For example, they can merely serve in a plural arrangement at the periphery of a turbine damper.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torque converters for use in the power trains of motor vehicles and, therefore, such adaptations should and are intended to be comprehended within the meaning and range of equivalence of the appended claims.

What is claimed is:

1. A hydrokinetic torque converter for transmission of torque between a rotary output member of a prime mover and a rotary input member of a transmission, comprising: a turbine; a damper for the turbine; and means for transmitting hydrokinetic energy from said turbine to said input member, including a hub and an additional component of an inner region of a turbine shell, which is free of its own hub and supported by an input element of said damper, said inner region of said turbine shell being furnished with a stamped first collar, said damper including an input element having a second collar, said hub having a cylindrical surface spaced apart from one of said collars and further comprising a thrust bearing disposed between and guided by said hub and said one collar.

2. The torque converter of claim 1, wherein said additional component is a part produced essentially without machining.

3. The torque converter of claim 1, wherein the transmission is a continuously variable transmission.

4. The torque converter of claim 1, wherein the transmission is an automatic transmission.

5. The torque converter of claim 1, wherein said additional component is a stamped metallic blank constituting said turbine shell.

6. The torque converter of claim 1, wherein said damper includes an input element having a collar rotatably mounted at the periphery of said hub, said hub being provided on said input member.

7. The torque converter of claim 1, wherein said bearing is at least partially surrounded by said one collar.

8. The torque converter of claim 1, further comprising a bond between said shell and said input element, said bond including at least one of a welded, a form-locking and a force-locking connection.

9. The torque converter of claim 8, wherein said bond includes a welded connection selected from the group consisting of laser-, resistance-, spot- and friction-welded connections.

10. The torque converter of claim 1, wherein said damper includes at least one output element, said hub being provided on the hub of said transmission and further comprising a connection between said at least one output element and said input member, said connection comprising profiled portions provided on said at least one output element and said input member and means for non-rotatably securing said profiled portions to each other.

11. The torque converter of claim 10, wherein said damper further includes an input element facing away from said at least one output element and having a circumferentially extending internal profile, said hub having an external profile adjacent to and cooperating with said internal profile to permit a predetermined angular movement of said hub and said input element relative to each other.

12. The torque converter of claim 11, wherein at least one of said profiles has at least one gear tooth.

13. The torque converter of claim 12, wherein one of said profiles is arranged to be automatically centered by the other of said profiles.

14. The torque converter of claim 11, wherein at least one of said profiles has an axially homogeneous cross-sectional outline and includes portions of greater and lesser depth alternating with each other in a circumferential direction of said at least one profile.

15. The torque converter of claim 1, wherein said component consists, at least in part, of a sintered metal.

16. The torque converter of claim 15, wherein said metal is steel.

17. The torque converter of claim 15, wherein said component is a shaped article.

18. The torque converter of claim 1, wherein said hub consists, at least in part, of a sintered metallic material.

19. The torque converter of claim 18, wherein said metallic material is steel.

20. The torque converter of claim 1, wherein said transmission forms part of a power train in a vehicle.

21. The torque converter of claim 1, further comprising a housing for said turbine and a bypass clutch between said housing and said damper.

22. A hydrokinetic torque converter for transmission of torque between a rotary output member of a prime mover and a rotary input member of a transmission, comprising: a turbine; a damper for the turbine; and means for transmitting hydrokinetic energy from sad said turbine to said input member, including a hub rotatable with said input member, and an additional component, wherein said damper comprises two annular input elements abutting each other at a substantially right angle and being welded to one another, one of said input elements having a collar rotatably mounted on a periphery of said hub.

* * * * *